Patented Sept. 8, 1942

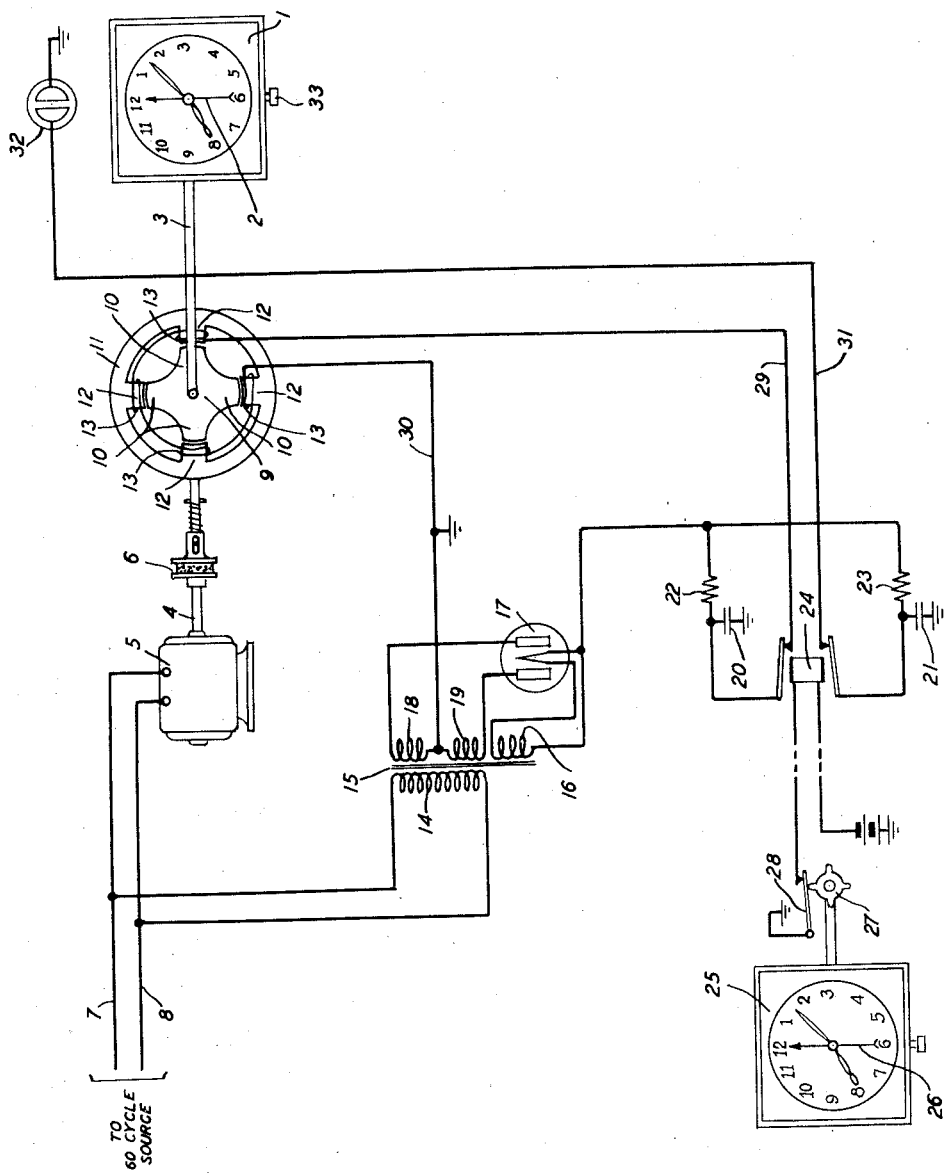

2,294,923

UNITED STATES PATENT OFFICE 2,294,923

ELECTRIC CLOCK SYSTEM

Robert F. Massonneau, Scarsdale, N. Y., assignor to Bell Telephone Laboratories, Incorporated, New York, N. Y., a corporation of New York Application May 31, 1941, Serial No. 395,968

7 Claims. (Cl. 58—35)

This invention relates to certain new and useful improvements in electric clock systems and more particularly to the automatic correction of synchronous motor-driven clocks.

In electric clock systems secondary clocks are quite commonly driven by synchronous alternating current motors which receive current from commercial power lines supplied with power from generators synchronized by a master clock so that they will send out current of 60-cycle periodicity. Such secondary clocks will, over quite long periods, keep fairly accurate time. Where very accurate time is required in time-of-day announcing bureaus, etc. is is desirable that means be provided for automatically correcting the settings of such secondary clocks with respect to a standard master clock.

It is therefore the object of the present invention to provide simple and inexpensive facilities for automatically correcting the setting of an electric motor-driven secondary clock.

To attain this object, the motor which drives the seconds or sweep hand of the clock is connected to the driving shaft of such hand through a friction clutch so that when the motor is driven from a source of 60-cycle alternating current it rotates the sweep hand one revolution each minute. Positioned on the driving shaft between the sweep hand and the clutch is a rotor having four equally spaced pole-pieces which rotate within a stator also having four equally spaced pole-pieces. The pole-pieces of the rotor and stator are positioned to be in true magnetic alignment exactly on each minute and on the fifteen second intervals thereof.

Connected to the alternating current supply circuit which drives the motor is a full-wave rectifier which provides charging current for two condensers. A discharge circuit for one of these condensers extends over contacts of the relay through the windings of the stator and a discharge circuit for the other condenser extends over other contacts of the relay through a neon lamp associated with the clock. The relay is operated from master clock every fifteen seconds exactly on the minute and on the fifteen-second intervals thereof, whereby the condensers are permitted to charge for substantially fifteen seconds and to discharge suddenly at precisely fifteen-second intervals through the stator windings and through the neon lamp.

If at any fifteen-second interval, at which instant the master clock control relay operates and the condensers discharge, the secondary clock indicates the correct time, the pole-pieces of the rotor and stator will be in alignment and no correction will be made by the energization of the stator windings by the condenser discharge, but the neon lamp will flash to indicate the exact fifteen-second interval. If, however, the secondary clock is either fast or slow at such instant, the rotor pole-pieces will be out of alignment with the stator pole-pieces and the short energization of the stator windings by the condenser discharge will move the rotor pole-pieces into alignment with the stator pole-pieces thereby advancing the sweep hand of the clock a fraction of a revolution in the direction of rotation if the clock is slow or backward if the clock is fast. The condenser discharge through the stator windings being of extremely short duration will not interfere with the regular operation of the clock by the driving motor. If the clock requires resetting for more than a fraction of a minute the hour, minute and seconds hands may be approximately reset by the usual manual resetting knob to within 7½ seconds of the correct time and thereafter accurately reset by the automatic means just described.

For a clearer understanding of the invention reference may be had to the following detailed description taken in connection with the single figure of the drawing.

Referring to the drawing, a secondary clock adapted to be driven by a synchronous alternating current motor is shown at 1 having a sweep or seconds hand 2. This seconds hand is driven by a shaft 3 which is coupled to the shaft 4 of the driving motor 5 through a friction clutch 6. Motor 5 is connected with a power line 7, 8 supplied with alternating current of 60-cycle frequency by a generator regulated in the usual manner to deliver current at a substantially invariable 60-cycle frequency or supplied with alternating current from an oscillator or other generating means capable of supplying current of the required voltage and at a 60-cycle frequency.

Mounted on the shaft 3 between the secondary clock 1 and the clutch 6 is a rotor 9 having four equally spaced rotor pole-pieces 10. Surrounding the rotor 9 and fixed with respect thereto is a stator yoke 11 also having four inwardly extending equally spaced pole-pieces 12. The rotor and stator pole-pieces are so positioned that when the sweep hand 2 of the secondary clock is exactly at 12, 3, 6 or 9 on the dial, that is indicating any exact minute or fifteen-second interval thereof, such rotor and stator pole-pieces will be in magnetic alignment, and the rotor pole-pieces will be free to rotate within the ends of the stator polepieces. Each stator pole-piece 12 is surrounded by a stator winding 13, the four windings being connected in series aiding relationship in a control circuit 29, 30.

Bridged across the power line 7, 8 is the primary winding 14 of the transformer 15, one secondary winding 16 of which is connected in circuit with the filament or cathode of a full-wave rectifier 17 and the other two secondary windings 18 and 19 of which are connected to ground at their junction point and at their other terminals to the anodes of the tube 17. Associated with the tube 17 are two condensers 20 and 21. The charging circuit of condenser 20 may be traced from ground through one or the other of the secondary windings 18 or 19 of the transformer 15, across one or the other of the anode-cathode gaps of the tube 17 through resistance 22 and condenser 20 to ground depending upon the polarity of the incident half wave of the supply current. The charging circuit of condenser 21 is established in parallel therewith through resistance 23 and condenser 21 to ground. Thus during fifteen-second intervals when relay 24 is deenergized, the two condensers receive charges.

Associated with the two condensers is a relay 24 which is operated at fifteen-second intervals exactly on each minute and the fifteen-second intervals thereof, over a circuit controlled by a master clock 25. To control the circuit of relay 24, the shaft of the sweep or seconds hand 26 of the master clock may be provided with a cam 27 which at fifteen-second intervals operates the spring 28 to close the relay circuit. Upon each operation of relay 24, a discharge circuit for condenser 20 is established from ground through such condenser, over the upper contacts of relay 24, conductor 29, thence serially through the stator windings 13 and over conductor 30 to ground, whereby the condenser 20 discharges to momentarily energize the stator windings. Also upon each operation of relay 24, a discharge circuit for condenser 21 is established from ground through such condenser, over the lower contacts of relay 24, conductor 31 to ground through the neon lamp 32. Thus precisely on each minute and on each fifteen-second interval thereof, the condensers 20 and 21 are discharged to momentarily energize the stator windings 13 and to flash the neon lamp 32.

If at any fifteen-second interval, at which instant the master clock controlled relay 24 operates and the condensers 20 and 21 discharge, the secondary clock indicates the correct time, the pole-pieces 10 of the rotor 9 will be in magnetic alignment with the pole-pieces 12 of the stator 11 and no correction will be made by the energization of the stator windings 13 by the discharge of condenser 20, but the neon lamp 32 will flash to indicate the exact fifteen-second interval. If, however, the secondary clock is either fast or slow at such instant, the rotor pole-pieces 10 will be out of alignment with the stator pole-pieces 12 and the short energization of the stator windings 13 by the discharge of condenser 20 will move the rotor pole-pieces 10 into alignment with the stator pole-pieces 12 thereby advancing the sweep hand 2 of the clock 1 a fraction of a revolution in the direction of its rotation if the clock is slow or backwards if the clock is fast. The condenser discharge through the stator windings being of extremely short duration will not interfere with the regular operation of the clock by the driving motor 5.

If the clock requires resetting more than a fraction of a minute, the manual reset knob 33 may be used to reset the hour, minute and seconds hands to within at least 7½ seconds of the correct time and thereafter an accurate resetting to the exact time will be made at the following fifteen-second interval by the master clock 25 in the manner previously described.

What is claimed is:

1. In combination, a secondary clock having a seconds hand, means connected to the shaft of said seconds hand for driving said clock, a resetting motor having a multipole rotor mounted on said shaft, a multipole stator and stator windings and means operable at precise intervals under the control of a master clock for momentarily energizing said stator windings whereby the pole-pieces of said rotor are brought into alignment with the pole-pieces of said stator to advance said seconds hand in either a clockwise or a counter-clockwise direction depending upon whether said secondary clock is slow or fast.

2. In combination, a secondary clock having a seconds hand, means connected to the shaft of said seconds hand for driving said clock, a resetting motor having a multipole rotor mounted on said shaft, a multipole stator and stator windings, a condenser, means for charging said condenser and means operable at precise intervals under the control of a master clock for causing said condenser to discharge through said stator windings, whereby the pole-pieces of said rotor are brought into alignment with the pole-pieces of said stator to advance said seconds hand in either a clockwise or a counter-clockwise direction depending upon whether said secondary clock is slow or fast.

3. In combination, a secondary clock having a seconds hand, a motor for driving the shaft of said seconds hand, a friction clutch interposed between said motor and said shaft, a resetting motor having a multipole rotor mounted on said shaft, a multipole stator and stator windings, a condenser, means for charging said condenser and means operable at precise intervals under the control of a master clock for causing said condenser to discharge through said stator windings whereby the pole-pieces of said rotor are brought into alignment with the pole-pieces of said stator to advance said seconds hand in either a clockwise or a counter-clockwise direction depending upon whether said secondary clock is slow or fast.

4. In combination, a secondary clock having a seconds hand, a motor for driving the shaft of said seconds hand, a friction clutch interposed between said motor and said shaft, a resetting motor having a multipole rotor mounted on said shaft, a multipole stator and stator windings, a source of current for operating said driving motor, a condenser, rectifying means for charging said condenser from said source and means operable at precise intervals under the control of a master clock for causing said condenser to discharge through said stator windings whereby the pole-pieces of said rotor are brought into alignment with the pole-pieces of said stator to advance said seconds hand in either a clockwise or a counter-clockwise direction depending upon whether said secondary clock is slow or fast.

5. In combination, a secondary clock having a seconds hand, a motor for driving the shaft of said seconds hand, a friction clutch interposed between said motor and said shaft, a resetting motor having a multipole rotor mounted on said shaft, a multipole stator and stator windings, a source of current for operating said driving motor, two condensers, rectifying means for charging said condensers from said source, a neon lamp and means operable at precise intervals under the control of a master clock for causing one of said condensers to discharge through said stator windings whereby the pole-pieces of said rotor are brought into alignment with the polepieces of said stator to advance said seconds hand in either a clockwise or a counter-clockwise direction depending upon whether said secondary clock is slow or fast and for causing the other of said condensers to discharge through said lamp to indicate said precise interval.

6. In combination, a secondary clock having a seconds hand, a motor for driving the shaft of said seconds hand, a friction clutch interposed between said motor and said shaft, a resetting motor having a multipole rotor mounted on said shaft, a multipole stator and stator windings, a source of current for operating said driving motor, a condenser, rectifying means for charging said condenser from said source, a relay, a master clock, means controlled by said master clock for periodically operating said relay at precise time intervals and a discharge circuit for said condenser extending through said stator windings and established upon each operation of said relay, whereby the pole-pieces of said rotor are brought into alignment with the pole-pieces of said stator to advance the seconds hand of said secondary clock in either a clockwise or a counter-clockwise direction depending upon whether said secondary clock is slow or fast.

7. In combination, a secondary clock having a seconds hand, a motor for driving the shaft of said seconds hand, a friction clutch interposed between said motor and said shaft, a resetting motor having a multipole rotor mounted on said shaft, a multipole stator and stator windings, a source of current for operating said driving motor, two condensers, rectifying means for charging said condensers from said source, a neon lamp, a relay, a master clock, means controlled by said master clock for periodically operating said relay at precise time intervals, a discharge circuit for one of said condensers extending through said lamp and a discharge circuit for the other of said condensers extending through said stator windings, said circuits being established upon each operation of said relay whereby said lamp is flashed to indicate the precise time interval indicated by said master clock and whereby the pole-pieces of said rotor are brought into alignment with the polepieces of said stator to advance the seconds hand of said secondary clock in either a clockwise or a counter-clockwise direction depending upon whether said secondary clock is slow or fast.

ROBERT F. MASSONNEAU.